United States Patent [19]

Green

[11] Patent Number: 5,452,077

[45] Date of Patent: Sep. 19, 1995

[54] TRANSIENT-FREE METHOD OF DETERMINING SATELLITE ATTITUDE

[75] Inventor: James H. Green, Hermosa Beach, Calif.

[73] Assignee: Hughes Aircraft Company, Los Angeles, Calif.

[21] Appl. No.: 164,592

[22] Filed: Dec. 9, 1993

[51] Int. Cl.$^6$ .............................................. G01B 11/26
[52] U.S. Cl. ...................... 356/139.01; 356/139.03; 356/140; 244/171
[58] Field of Search ................... 356/139.01, 139.03, 356/140, 141.2, 141.5, 152.1; 244/171

[56] References Cited

U.S. PATENT DOCUMENTS

| | | | |
|---|---|---|---|
| 3,230,378 | 1/1966 | Hooker | 244/171 |
| 3,493,765 | 2/1970 | Kelly et al. | 244/171 |
| 4,730,798 | 3/1988 | Wertz | 244/171 |
| 5,108,050 | 4/1992 | Maute | 244/171 |
| 5,311,022 | 5/1994 | Savaca | 250/347 |
| 5,337,241 | 8/1994 | Takahashi | 364/434 |

*Primary Examiner*—Mark Hellner
*Attorney, Agent, or Firm*—Terje Gudmestad; Wanda K. Densow-Low

[57] ABSTRACT

A method of spacecraft attitude determination is proposed which calculates the bias between the usual two-cell and four-cell earth sensor measurements. During period of sun or moon interference, when the two-cell mode is selected, this bias is added to or subtracted from the two-cell measurements. This removes the step change in the calculated spacecraft roll and pitch angles when the switch is made between two and four cell modes and allows a substantially more accurate measurement to be obtained from a given sensor for the period of time for which interference would otherwise reduce sensor performance.

10 Claims, 1 Drawing Sheet

TRANSIENT-FREE METHOD OF DETERMINING SATELLITE ATTITUDE

TECHNICAL FIELD

This invention relates to satellite attitude determination and more particularly to a method of determining satellite attitude which allows a more highly accurate measurement to be made during periods of sun or moon interference.

BACKGROUND ART

The Earth Sensor Assembly (ESA) used on certain existing lines of spacecraft has four quadrant detectors (see FIG. 1) that are used to determine the spacecraft's roll and pitch angle. The roll angle can be calculated from the difference between the outputs of detectors 1 and 3 (known as the west pair of detectors) or detectors 2 and 4 (known as the east pair of detectors). During normal operation, roll measurements are computed from both the east and west pair of detectors (known as the two-cell roll measurements) and these two measurements are averaged to obtain the final roll measurement (known as the four-cell roll measurement). Similarly, the pitch angle of the spacecraft can be calculated from the difference between the readings of detectors 1 and 2 (the north pair of detectors) or detectors 3 and 4 (the south pair of detectors). These two-cell pitch measurements are then averaged to obtain the final, or four-cell, pitch measurement.

When the sun or moon enters the field of view of one of the four detectors, the reading from that detector becomes corrupted. At these times, the corrupted detector is ignored and the roll and pitch measurement are taken from whichever of the two-detector measurements is not corrupted by the interference. When the sun or moon leaves the field of view of one detector and enters the field of view another, then the processing is switched to a different set of two-cell measurements so that the newly corrupted detector does not affect the final measurements. When the sun or moon leaves the field of view of all the detectors, the roll and pitch measurements are switched back to the four-cell measurements.

When the earth sensor processing is switched from a four-cell to a two-cell mode, a step change in the roll and pitch measurements occur. This step change in the measurement induces a pointing transient on all three axes of the spacecraft. This transient is repeated when the switch from the two-cell to the four-cell mode occurs. Moreover, a one degree change in reference can cause pointing transients significantly greater than one degree. In addition, the change in reference is undesirable because it is a change to a less accurate measurement.

A number of error sources affect the ESA. The largest of these error sources; thermal deviations and errors due to weather-based changes in earth radiance, change slowly with time. The errors are between the two-cell measurements on a given axis are random and are not correlated. Since the four-cell measurements are simply the average of the two-cell measurements, the four-cell measurement will not in general equal either of the two cell measurements. Also, since the four-cell error is the average of the two-cell errors, the four-cell measurement is more accurate by a factor of $\sqrt{2}$. Thus, even if the spacecraft could be made to transition from the four-cell to the two-cell reference with no overshoot, overall pointing would still be less accurate on the two-cell measurement.

Transient-free switching algorithms have been designed on existing satellites for switching from a beacon to an earth sensor, and for switching between separate earth sensors. These previous methods merely eliminated the transient that occurred when the sensors were switched whereas the method of the present invention not only eliminates the transient during switching, but allows a substantially more accurate measurement to be obtained from a given sensor for the period of time for which interference would otherwise reduce sensor performance.

SUMMARY OF THE INVENTION

With the foregoing in mind, it is an object of the present invention to provide an improved method of determining satellite attitude.

It is another object of the present invention to provide a method of satellite attitude determination which allows satellite earth sensor processing to be switched from a "four-cell" method to a "two-cell" method and back with no transient or degradation of the accuracy of the measurement.

It is another object of the present invention to provide a method of satellite attitude determination which improves overall pointing during periods of sun or moon interference.

In accordance with the present invention a method of attitude determination is provided which eliminates the transient associated with changing between two and four-cell measurements and, where the amount of time spent on two-cell reference is small, pointing accuracy is kept at nearly the four-cell level during the two-cell operation. The method of the present invention accomplishes the foregoing objects by taking advantage of the fact that the important error sources all change slowly with time. Accordingly, during periods of four-cell operation, the amount of error (also known as the bias) between the two-cell measurements is calculated for the roll and pitch axes. This bias is run through a low pass filter to remove the effects of high frequency noise. When two-cell operation is commanded, the earth sensor measurement is taken to be whichever two-cell measurement is selected, plus or minus the filtered bias. With this approach, the earth sensor measurements remain virtually unchanged by the switch. Since two-cell operation is only commanded when one of the detectors is corrupted by sun or moon interference, it is not possible to calculate the error between the two-cell measurements during two-cell operation and so the bias computation and filtering is stopped during two-cell operation. If the sun or moon interference shifts to a different detector, a different set of two-cell measurements is selected so that the newly corrupted detector does not effect the earth sensor measurement. The previously computed bias is simply added or subtracted to the new two cell measurement to eliminate any switching transient. When four-cell operation is again commanded, the bias computation is restarted and no offset is added to the earth sensor measurement.

The net effect of the 4–2 cell transient-free switching method of the present invention, is that better pointing accuracy is obtained during periods when the sun or moon interfere with the earth sensor. This eliminates the need for relaxed pointing requirements during interference periods. In addition, it is no longer necessary to exactly determine the sun and moon interference regions since virtually no pointing degradation occurs in the two-cell mode with the use of the method of the present invention and a large stay-out zone may be used with little loss of performance.

DETAILED DESCRIPTION OF THE PREFERRED EMBODIMENT

Figure 1:
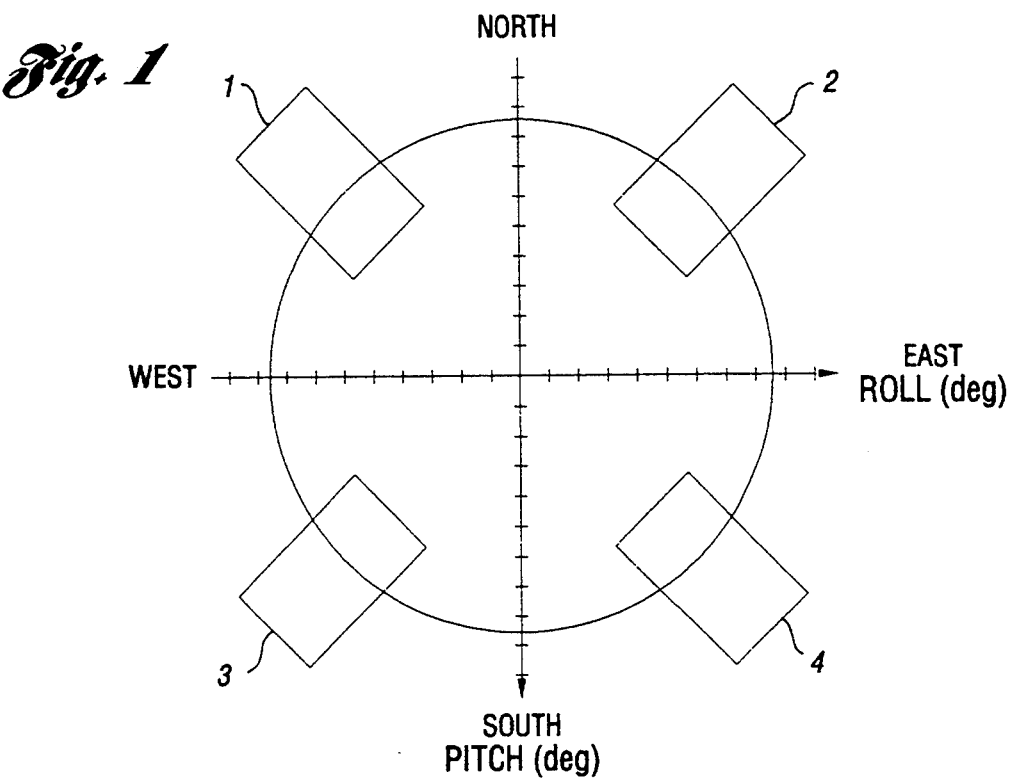
FIG. 1 shows the layout of four detectors of a conventional earth sensor assembly, oriented toward earth and showing spacecraft roll, pitch and yaw (into page) axes.
Figure 2:
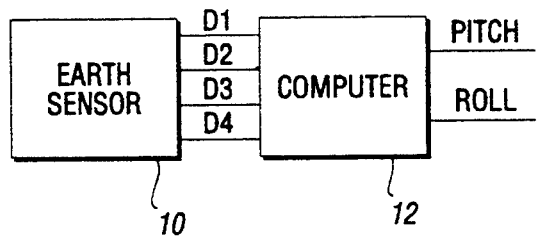
FIG. 2 is a block diagram of the attitude measurement system of the present invention.

Referring now to the schematic block diagram of FIG. 2, a conventional earth sensor is generally designated 10. The sensor 10 includes the four infrared quadrant detectors 1, 2, 3, and 4 depicted in FIG. 1. The outputs of the detectors 1–4, designated D1–D4, are provided to a computer 12 which is programmed to use the magnitude information in the detector raw data to calculate pitch and roll attitude signals used for control of the satellite in earth pointing mode.

Figure 3:
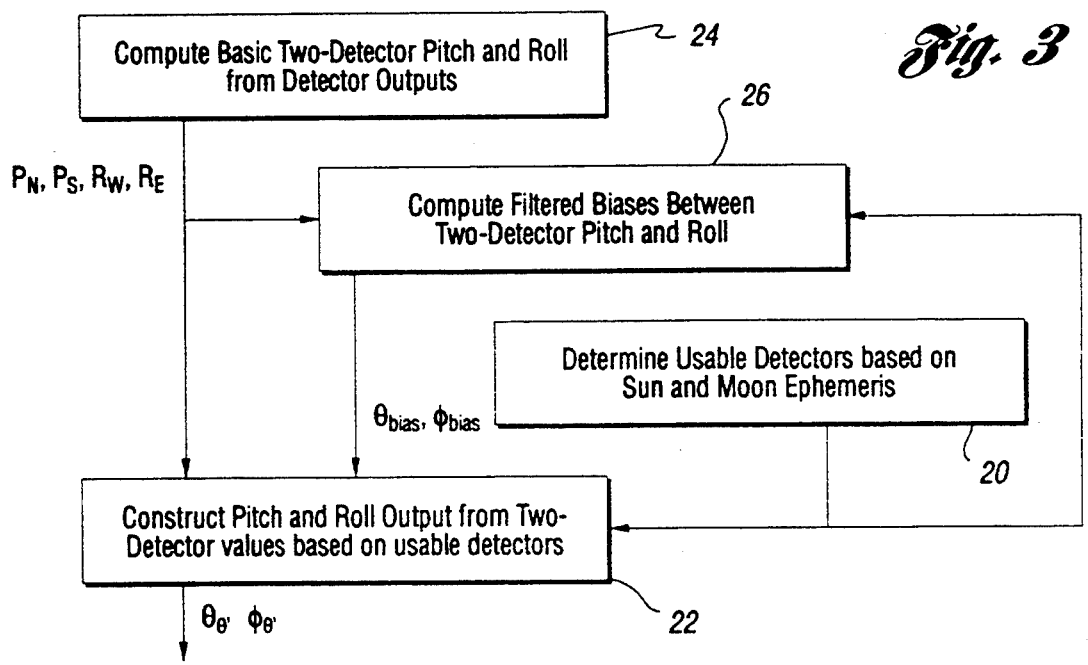
FIG. 3 is a flow chart of the program for calculating pitch and roll in accordance with the present invention.

FIG. 3 is a flow chart depicting the method of calculating pitch and roll angles in accordance with the present invention. The block 20 selects the detector outputs that are to be used in making attitude calculations. The selection is based on the Sun and Moon Ephemeris information which identifies which if any detector outputs are corrupted. The block 20 provides an input to a block 22, in the form of a four bit binary code as shown in Table 1, which identifies the usable detectors. The block 22 calculates the pitch and roll angles in accordance with the equations shown in Table 1 depending on the four bit binary code. The code identifies the useable detectors by a "1" and the corrupted detectors by a "0". The most significant digit identifies the status of detector 1, while the least significant digit identifies the status of detector 4. When the binary code is "1111", the two-detector roll and pitch angle calculations performed in a block 24 are provided to the block 22 for computation of the final pitch and roll output.

In block 24, the basic two-detector pitch and roll angles of the satellite are calculated using the outputs D1–D4 of the detectors 1–4. The pitch angle is calculated using the outputs, D1 and D2, of the North pair of detectors 1 and 2 and from the outputs, D3 and D4, of the South pair of detectors 3 and 4. Thus, $$P_N = D1 - D2 \quad P_S = D3 - D4$$

Similarly, the satellite roll angle are calculated using the outputs, D1 and D3, of the West pair of detectors 1 and 3 and the outputs, D2 and D4, of the East pair of detectors 2 and 4. Thus, $$R_W = D1 - D3 \quad R_E = D2 - D4$$

As indicated in Table 1, the two-cell measurements $P_N$, $P_S$, and $R_W$, $R_E$ are averaged, in the block 22, during normal operations when all detectors are usable, to obtain the final four-cell pitch and roll angle determinations. Thus, $$\text{Pitch} = \theta_e = (P_N + P_S)/2$$

and $$\text{Roll} = \phi_e = (R_W + R_E)/2$$

The bias or error between the various two-cell measurements are calculated in block 26, using the following formulas when the 4-cell operation has been commanded, i.e. When the selected detector bit pattern is "1111".

$$\phi_{diff} = \frac{(R_E - R_W)}{2} \quad \theta_{diff} = \frac{(P_N - P_S)}{2}$$

The 2-cell measurements, $R_E$, $R_W$, $P_N$ and $P_S$ are contaminated by high frequency noise. This noise will be passed on to the unfiltered biases $\phi_{diff}$ and $\theta_{diff}$. When two-cell operation is commanded, i.e. When the bit pattern is not "1111" no computation of the biases is performed and the values of $\phi_{diff}$ and $\theta_{diff}$ remain constant until four-cell operation is again commanded. Since the magnitude of the noise can be several times as great as the size of the bias, it is necessary to remove the effects of the noise from the computation during four-cell operation. This is done through the addition of a low pass filtering process to the bias calculation. The output of the filter passes signals with frequencies below its bandwidth essentially unaltered while signals above the filter bandwidth are attenuated. The result is that slow variations in the input signal will be passed on to the output while fast variations, such as noise, will be eliminated. For this application, a time constant of 360 seconds is typically chosen. This means that signals of up to the bandwidth of $2\pi/\tau$ Hz, where $\tau$ is the time constant, will be passed.

The following equations are one way to implement a first order low pass filter in difference equation form.

$$\phi_{bias} = a\phi_{bias} + (1-a)\phi_{diff} \quad \theta_{bias} = a\theta_{bias} + (1-a)\theta_{diff}$$

where "a" is a constant that is calculated from the filter time constant using the following formula:

$$a = e^{T/\tau}$$

where "T" is the update rate of the filter. For this application, the equations are executed every 0.5 seconds and the time constant is 360 seconds, so "a" has a value of:

$$a = e^{\frac{0.5}{360}} = 0.99861$$

TABLE 1

| Earth Sensor Pitch and Roll Output Selection | | |
|---|---|---|
| SELECTED DETECTORS (SD) | PITCH ($\theta_e$) | ROLL ($\phi_e$) |
| 1111 | $(P_N + P_S)/2$ | $(R_W + R_E)/2$ |
| 0111 | $P_S + \theta_{bias}$ | $R_E - \phi_{bias}$ |
| 1011 | $P_S + \theta_{bias}$ | $R_W + \phi_{bias}$ |
| 1101 | $P_N - \theta_{bias}$ | $R_E - \phi_{bias}$ |
| 1110 | $P_N - \theta_{bias}$ | $R_W + \phi_{bias}$ |
| 0011 | $P_S + \theta_{bias}$ | 0 |
| 1100 | $P_N - \theta_{bias}$ | 0 |

What is claimed is:

1. A method of determining spacecraft attitude from the outputs of first, second, third, and fourth quadrant detectors of an earth sensor, said outputs being subject to corruption by interference from the sun and moon, comprising the steps of:

calculating attitude information ($P_N, P_S, R_W, R_E$) based on the difference in outputs of first and second pairs of said detectors, when the outputs of all detectors are uncorrupted by said interference, calculating first ($\theta_{bias}$) and second ($\phi_{bias}$) filtered attitude biases related to the difference between attitude calculations made using a first pair of said detectors and attitude calculations made using a second pair of detectors, calculating an attitude angle ($\theta_e$) by offsetting the information calculated from said first pair of detectors by the amount of said bias, when the outputs of one of the detector in said second pair of detectors is corrupted by said interference.

2. The method defined in claim 1 wherein said attitude angle calculation includes a pitch calculation ($P_N$) based on the difference between the outputs of said first (D1) and second (D2) detectors, and said first attitude angle calculation is reduced by the amount of said first bias.

3. The method defined in claim 1 wherein said first attitude angle calculation includes a pitch calculation ($P_S$) based on the difference between the outputs of said third (D3) and fourth (D4) detectors, and said first attitude angle calculation is increased by the amount of said first bias.

4. The method defined in claim 1 comprising the further step of calculating a pitch angle ($\theta_e$), when the outputs of all detectors are uncorrupted by said interference, based on the average of the difference between the outputs of said first (D1,D2) and second (D3,D4) pairs of detectors and wherein said first pair of detectors comprises said first (D1) and second (D2) quadrant detectors and said second pair of detectors comprises said third (D3) and fourth (D4) quadrant detectors.

5. The method defined in claim 1 wherein said first attitude angle calculation is a roll ($R_W$) calculation based on the difference between said first (D1) and third (D3) detectors, and said first attitude angle calculation is increased by the amount of said second bias.

6. The method defined in claim 1 wherein said first attitude angle calculation is a roll ($R_E$) calculation based on the difference between said second (D2) and fourth (D4) detectors, and said first attitude calculation is reduced by the amount of said second bias.

7. The method defined in claim 1 comprising the further step of calculating a roll angle ($\phi_e$), when the outputs of all detectors are uncorrupted by said interference, based on the average of the difference between the outputs of said first (D1,D3) and second (D2,D4) pairs of detectors, and wherein said first pair of detectors comprises said first and third quadrant detectors and second pair of detectors comprises said second and fourth quadrant detectors.

8. A method of determining spacecraft attitude from the outputs (D1,D2,D3,D4) of first, second, third, and fourth quadrant detectors of an earth sensor, said outputs being subject to corruption by interference from the sun and moon, comprising the steps of:

calculating a pitch angle ($\theta_e$) proportional to one half the sum of the difference between the outputs of first (D1,D2) and second (D3,D4) pairs of said detectors when the outputs of all detectors are uncorrupted by interference, calculating a roll angle ($\phi_e$) proportional to one half the sum of the difference between the outputs of third (D1,D3) and fourth (D2,D4) pairs of said detectors when the outputs of all detectors are uncorrupted by interference, calculating a filtered pitch bias ($\theta_{bias}$) and a filtered roll bias ($\phi_{bias}$)

$$\phi_{bias} = a\phi_{bias} + (1-a)\phi_{diff} \quad \theta_{bias} = a\theta_{bias} + (1-a)\theta_{diff}$$

where "a" is a constant related to the filter time constant and, $$\phi_{diff} = \frac{(R_E - R_W)}{2} \quad \theta_{diff} = \frac{(P_N - P_S)}{2}$$

where, $$P_N = D1-D2 \quad P_S = D3-D4$$

and, $$R_W = D1-D3 \quad R_E = D2-D4$$

calculating a pitch angle ($\theta_e$) using the outputs of said first pair of detectors when one of the detector in said second pair of detectors is corrupted by said interference, and offsetting said pitch calculation by the amount of said pitch bias, calculating a roll angle ($\phi_e$) using the outputs of said third pair of detectors when one of the detector in said fourth pair of detectors is corrupted by said interference, and offsetting said roll calculation by the amount of said roll bias.

9. A method of determining spacecraft attitude from the outputs (D1,D2,D3,D4) of first, second, third, and fourth quadrant detectors of an earth sensor, comprising the steps of:

calculating a first roll value ($R_W$) equal to the difference between the outputs (D1,D3) of said first and third quadrant detector, calculating a second roll value ($R_E$) equal to the difference between the outputs (D2,D4) of said second and fourth quadrant detectors, calculating a first pitch value ($P_N$) equal to the difference between the outputs of said first (D1) and second (D2) quadrant detector, calculating a second pitch value ($P_S$) equal to the difference between the outputs of said third (D3) and fourth (D4) quadrant detectors, calculating a roll angle bias ($\phi_{bias}$) as a function of one-half of the difference of said first and second roll values, calculating a pitch angle bias ($\theta_{bias}$) as a function of one-half of the difference of said first and second pitch values, calculating a roll angle ($\phi_e$) as a function of one-half of the sum of said first and second roll values if none of said detector outputs are corrupted, as a function of said first roll value offset by said roll angle bias if one of said second or fourth quadrant detector outputs are corrupted, and as a function of said second roll value offset by said roll angle bias if one of said first or third quadrant detector outputs are corrupted, calculating a pitch angle ($\theta_e$) as a function of one-half of the sum of said first and second pitch values if none of said detector outputs are corrupted, as a function of said first pitch value offset by said pitch angle bias if one of said third or fourth quadrant detector outputs are corrupted, and as a function of said second pitch value offset by said pitch angle bias if one of said first or second quadrant detector outputs are corrupted.

10. A method of determining spacecraft pitch attitude from the outputs of first, second, third, and fourth quadrant detectors of an earth sensor, said outputs being subject to corruption by interference from the sun and moon, comprising the steps of:

determining whether the outputs of any of said detectors are corrupted, calculating a pitch values ($P_N, P_S$) using the outputs of pairs of said detectors, when the outputs of all detectors are uncorrupted by said interference, calculating a filtered pitch bias ($\theta_{bias}$) related to the difference between attitude calculations made using a first pair of said detectors and attitude calculations made using a second pair of detectors, calculating a pitch angle ($\theta_e$) by offsetting the information calculated from said first pair of detectors by the amount of said bias, when the output of one of the detector in said second pair of detectors is corrupted by said interference.

* * * * *